Feb. 25, 1930. H. J. FISHER 1,748,875
MOTOR VEHICLE HOOD LOCK
Filed Sept. 6, 1928   2 Sheets-Sheet 1
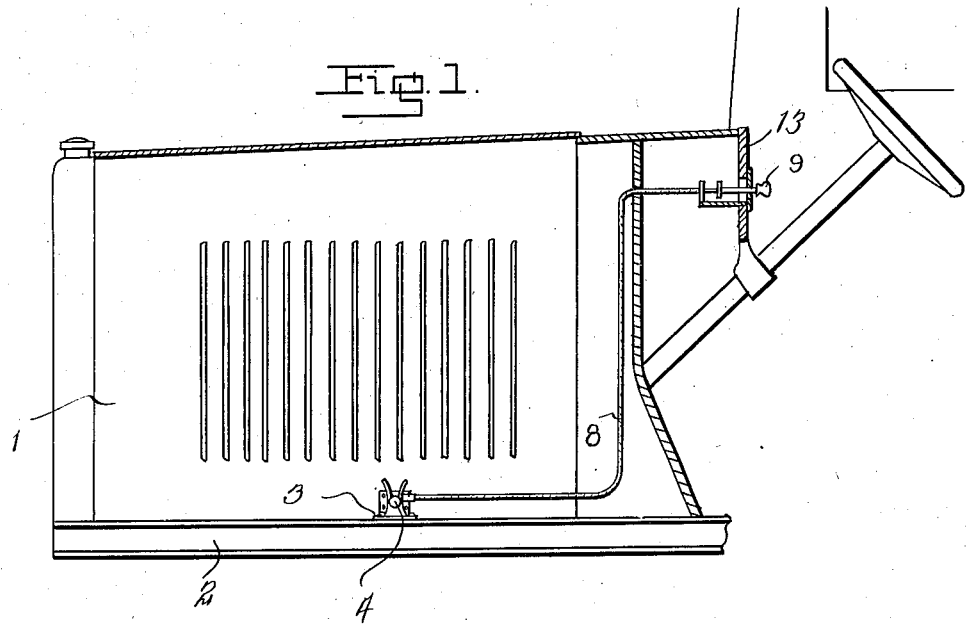
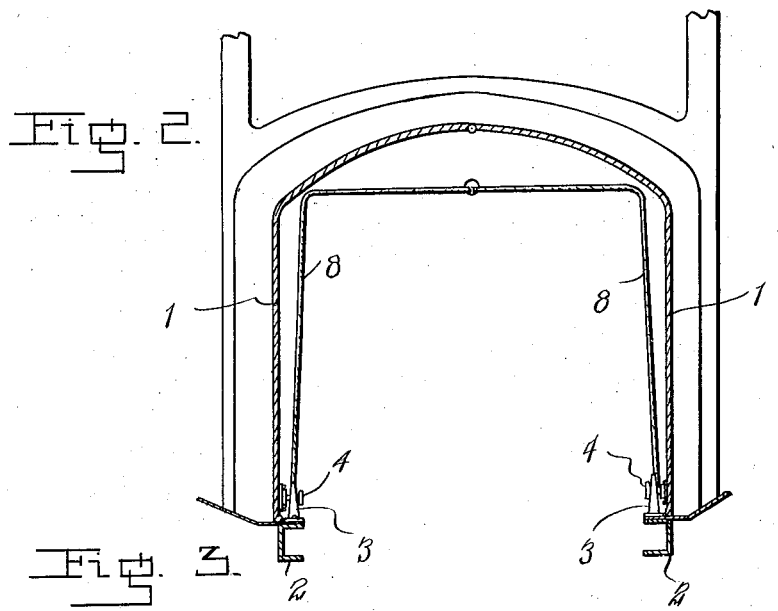
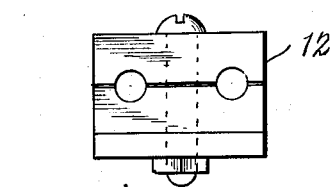
Inventor
H.J. Fisher
By Lacey & Lacey, Attorneys Feb. 25, 1930. H. J. FISHER 1,748,875
MOTOR VEHICLE HOOD LOCK
Filed Sept. 6, 1928   2 Sheets-Sheet 2
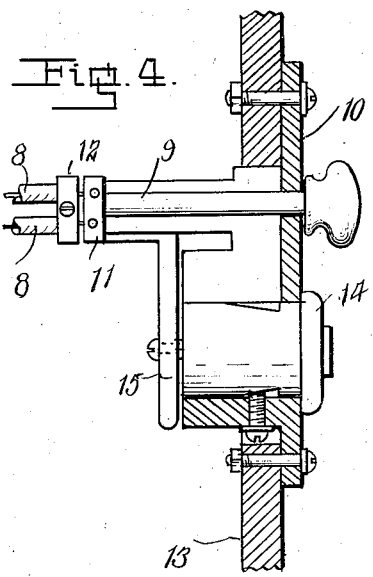
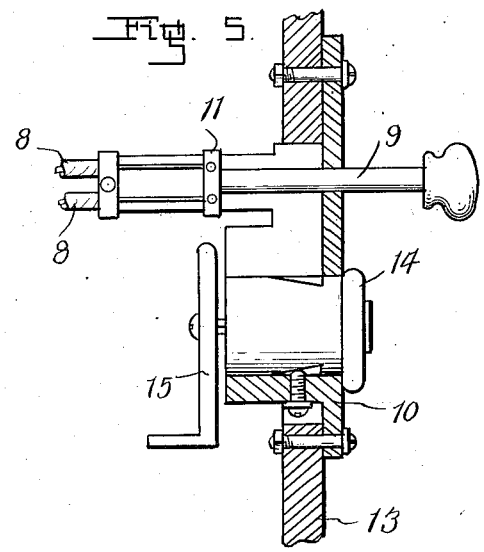
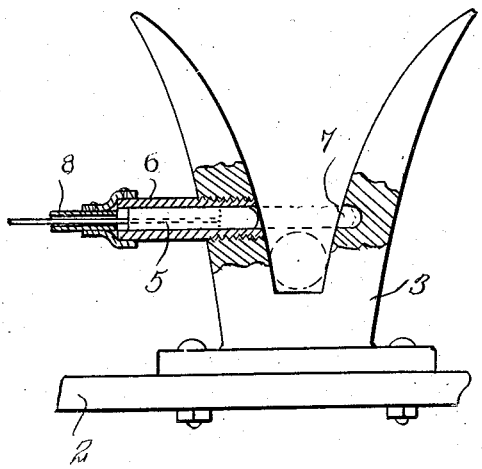
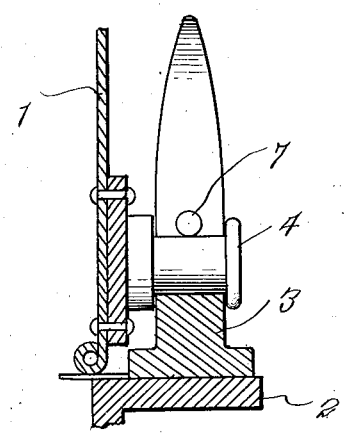
Inventor
H.J.Fisher Patented Feb. 25, 1930

1,748,875

UNITED STATES PATENT OFFICE

HOWARD J. FISHER, OF CRESTLINE, OHIO

MOTOR-VEHICLE HOOD LOCK

Application filed September 6, 1928. Serial No. 304,262.

The invention aims to prevent lifting the hoods of motor vehicles and to guard against tampering with the engine and associated parts usually housed beneath the hood and located forwardly of the dash.

In accordance with the invention complemental fastening means are provided on the flaps of the hood and the sides of the chassis and are operable from a convenient point within the vehicle, locking means being associated with the operable means to secure the fastening means and prevent unauthorized lifting of the hood when fastened.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which:

Figure 1 is a fragmentary view illustrative of one embodiment of the invention.

Figure 2 is a transverse sectional view of the hood and side bars of a motor vehicle showing the relative position of the fastening means for the flaps of the hood.

Figure 3 is a detail view of a clamp for connecting the elements extending to the fastening means.

Figure 4 is a fragmentary view illustrating the operable means for the fastenings and the lock associated therewith, the latter being adapted to secure the fastening means.

Figure 5 is a view similar to Figure 4, showing the position of the parts when the fastening means are in position to release the hood to permit the lifting and the lowering thereof as required.

Figure 6 is an enlarged detail view of the fastening means.

Figure 7 is a vertical transverse sectional view of the fastening means.

Corresponding and like parts are referred to in the following description and designated in the several views of the drawings by like reference characters.

The numeral 1 denotes the side flaps of a hood as generally provided for housing the engine and associated parts of a motor vehicle. The side bars of the chassis are designated by the numeral 2 and receive forked brackets 3 which are bolted or otherwise secured thereto preferably at opposite points and intermediate the length of the hood. The forked members flare upwardly and taper throughout their length, as indicated most clearly in Figures 6 and 7 of the drawings. Headed studs 4 are riveted or otherwise secured to the flaps 1 of the hood in position to enter the crotch of the respective forked brackets 3, as shown most clearly by the dotted lines in Figure 6 and the full lines in Figure 7 of the drawings. A bolt 5 associated with each of the brackets 3 is adapted to engage over the stud 4 and prevent casual disengagement of said stud from the bracket. The bolt 5 is slidable in a guide 6 applied to one of the forked members of the brackets, the end of the bolt, when projected, entering a socket 7 in the opposite forked member, thereby firmly securing the stud 4 within the crotch of the bracket 3. A connecting element, such as the Bowden cable or wire, forms connecting means between each of the bolts 5 and a control or operating member. This element or connection is designated by the numeral 8 and the control or operating member is denoted by the numeral 9 and consists of a rod slidably mounted in a plate 10 or other analogous part. A clamp 11 forms connecting means between the operating member 9 and the element extending to the bolt 5 so that when sliding the member 9 the bolt 5 will be moved into operative position to secure the stud 4, or withdrawn to admit of the stud freely entering or leaving the crotch of the forked bracket 3. The numeral 12 denotes a clamp for connecting the guide elements of the flexible connections 8.

The fastening means may be operated from the instrument board 13 or other convenient part of the vehicle readily accessible from the driver's seat. The numeral 14 designates a cylinder lock. Obviously, the lock 14 may be of any type and positioned so that it serves to secure the hood fastening means when adjusted to operative position. The numeral 15 designates a locking element which is actuated by means of the lock 14 to prevent movement of the control or operating member 9 when moved to project the bolt 5 across the stud 4 to secure the hood against being lifted. The operative position of the locking element 15 is indicated in Figure 4 of the drawings. Figure 5 shows the locking element 15 withdrawn from the path of the clamp 11 so that the member 9 may be adjusted to a position with the bolts 5 withdrawn, as indicated in Figure 6 of the drawings, so that the studs 4 may have free access to or from the crotches of the forked brackets 3.

When the hood is closed the studs 4 enter the crotches of the forked brackets 3. Upon moving the member 9 forwardly the bolts 5 are projected across the studs 4 and prevent casual disengagement thereof from the brackets 3, thereby securing the hood and preventing surreptitious lifting thereof and a tampering with the engine and adjunctive parts. Upon operating the lock 14 the member 9 is made secure in the forward position, thereby preventing withdrawal of the bolts 5. The lock, as stated, may be of any type, and when operated to release the part 9, the latter may be drawn backward, thereby withdrawing the bolts 5 from the path of the studs 4, so that the hood may be raised or lowered in the usual way, as will be readily understood.

Having thus described the invention, what is claimed is:

1. Hood locking means comprising a forked bracket, a stud to enter the crotch of the bracket, and a bolt adapted to be projected across the crotch and secure the stud when entered therein.

2. Hood securing means comprising a forked bracket, a cooperating stud to enter the crotch of the bracket, a bolt slidably mounted in a fork member of the bracket and adapted to have its end enter a socket formed in the opposite fork member, and means under control of the driver for operating said bolt.

3. Fastening means for the hood of an automobile, the same comprising forked brackets applied to the side bars of the chassis, studs applied to the sides of the hood and each adapted to enter the crotch of the companion bracket, a bolt associated with each of the brackets, operating means within convenient reach of the driver, and independent connecting means between the bolts and the said operating means.

4. Fastening means for the hood of an automobile, the same comprising forked brackets applied to the side bars of the chassis, studs applied to the sides of the hood and each adapted to enter the crotch of the companion bracket, a bolt associated with each of the brackets, operating means within convenient reach of the driver, independent connecting means between the bolts and the said operating means, and a locking device associated with the said operating means for securing the same and preventing unauthorized release of the fastening means when projected into operative position.

5. Hood locking means comprising a bracket having forks, a stud to engage between the forks, a tube extending transversely from one fork, a bolt slidable through said tube from a retracted position to an extended position across space between the forks and secure the stud in place between the forks, and actuating means for said bolt.

6. Hood locking means comprising a bracket having forks, a stud to engage between the forks, a tube extending transversely from one fork, a bolt slidable through said tube from a retracted position to an extended position across space between the forks and secure the stud in place between the forks, a slidably mounted plunger, a flexible connection between said bolt and cable, and means to secure said plunger in a set position with the bolt extending between the forks.

7. Hood locking means comprising a bracket having forks, a stud to engage between the forks, a tube extending transversely from one fork, a bolt slidable through said tube from a retracted position to an extended position across space between the forks and secure the stud in place between the forks, a slidably mounted plunger, a head at one end of said plunger, a flexible connection between said bolt and the head of said plunger, and a lock including an arm adapted to engage the head of said plunger and secure the plunger in a set position with the bolt extending between the forks.

In testimony whereof I affix my signature.

HOWARD J. FISHER. [L. S.]